United States Patent

[11] 3,547,464

| [72] | Inventor | Hans Drewitz<br>Munich, Germany |
|---|---|---|
| [21] | Appl. No. | 733,835 |
| [22] | Filed | June 3, 1968 |
| [45] | Patented | Dec. 15, 1970 |
| [73] | Assignee | Maschinenfabrik Augsburg-Nurnberg<br>Aktiengesellschaft<br>Munich, Germany |
| [32] | Priority | June 7, 1967 |
| [33] | | Germany |
| [31] | | No. M74293 |

[54] SOLID AXLE MOUNTING FOR VEHICLES
3 Claims, 3 Drawing Figs.

[52] U.S. Cl.................................................. 280/124;
267/57.1, 267/63

[51] Int. Cl.................................................. B60g 9/00
[50] Field of Search.......................................... 280/124

[56] References Cited
UNITED STATES PATENTS

| 3,033,591 | 5/1962 | Ward............................ | 280/124(F) |
| 3,154,321 | 10/1964 | McLean ....................... | 280/124(F) |

*Primary Examiner*—A. Harry Levy
*Attorney*—Stephens, Huettig & O'Connell

ABSTRACT: A solid axle for a vehicle is secured to the vehicle spring by a double cone metal-rubber bearing. This permits the axle to twist relative to the vehicle frame so that the vehicle wheels are not lifted from an uneven ground surface.

PATENTED DEC 15 1970

3,547,464

INVENTOR

Hans Drewitz

BY Stephens, Huettig and O'Connell
ATTORNEYS

SOLID AXLE MOUNTING FOR VEHICLES

This invention relates to the spring support for front or rear solid axles for a vehicle by means of a pair of levers extending longitudinally of the vehicle. Rigid axle supports including longitudinal levers have been used in which the lever has a wide rubber bearing on the axle and on the vehicle frame for transferring longitudinal as well as transverse forces to the axle. Such axle supports are inexpensive but they permit very little one-sided spring support so that the vehicle can only operate on a flat surface since one wheel at one end of the axle would be lifted off the road having an uneven surface. Another disadvantage of such axle support is a high stress on the rubber bearings causing large wear and tear.

Rigid axle mountings are also known which use a pair of longitudinally extending levers of which one is rigidly connected to the axle while the other is elastically connected to the axle. Such mountings have the disadvantage that the torque must be absorbed by the bearings of the longitudinal levers and also by the spring elements which again causes increased wear and tear.

The object of this invention is to avoid such disadvantage and to produce an axle mounting which is structurally simple and which permits a relatively large one-sided spring suspension or feathering of the axle without causing undue wear and tear.

In general, these objects are obtained by the use of a pair of levers extending parallel to the longitudinal axis of the vehicle frame and connected to the axle by rubber cushion mountings which also extend parallel to said axis. This permits only little longitudinal and diagonal movement but is very resilient with regard to torque or torsion forces.

This arrangement which incorporates connection of the lever to the vehicle frame by means of a rubber balljoint has the advantage that it makes possible a large one-sided spring suspension. This lessens the danger that a wheel will be lifted off an uneven road surface. Furthermore the construction is structurally simple and inexpensive.

Each end the bearing which is parallel to the longitudinal axis of the the solid axle is connected by rubber bearings to the longitudinal levers. The bearings are composed of a rubber and metal combination and formed so that relatively large twisting is permitted around the axis of the bearing which is parallel to the longitudinal axis of the vehicle. Each bearing is composed of two rubber-metal members which oppose each other and are held in compression by a connecting bolt. The rubber layer in each member is conical with thick walls. Thus the two rubber-metal members together form a double cone. The lines of projection of the cone walls extend to the theoretical apex of each cone which lies on the center line of the bolt and in a vertical plane passing through the center line of the a axle. The rubber-metal bearings makes possible that the axle is connected to the frame (one-sided spring suspension) without risking that the longitudinal lever is twisted around its longitudinal axis. Since neither the rubber bearing joint between the lever and the frame nor the spring means will absorb a torque movement, the twisting of the axle with respect to the frame is controlled by a diagonally extending brace or "Panhard" rod. Thus this invention employs simple and inexpensive rubber bearings, springs and "Panhard" rods.

The means by which the objects of this invention are obtained are described more fully with reference to the accompanying drawings, in which.

Figure 1:
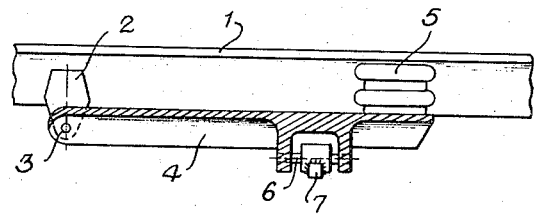
FIG. 1 is a cross-sectional view taken on the line 1–1 in FIG. 2.
Figure 2:
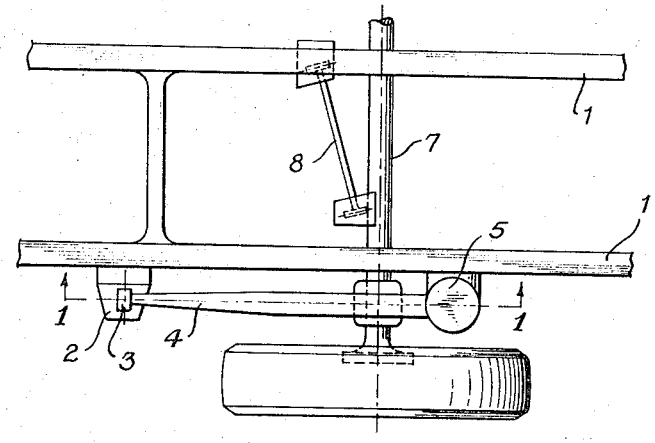
FIG. 2 is a plan view of the vehicle frame and axle mounting.

Attached to the vehicle frame 1 is a bearing bracket 2 carrying a rubber ball joint 3 to which is attached one end of lever 4. The other end of lever 4 is joined to an air cushion spring 5 which extends between the lever and frame 1. Vehicle axle 7 is mounted in a metal-rubber bearing 6 which, in turn, is joined to lever 4. A "Panhard" rod or brace 8 extends diagonally across the frame between the axle 7 and the frame.

Figure 3:
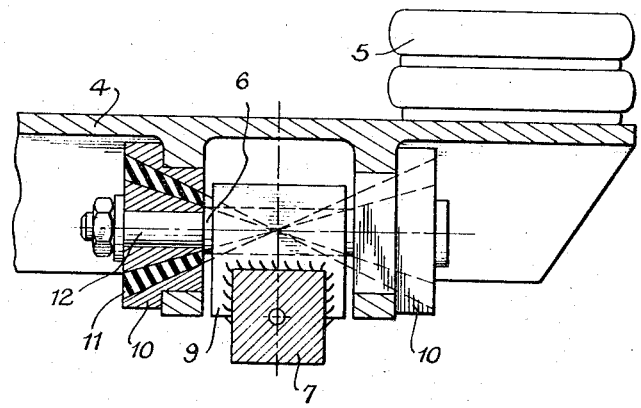
FIG. 3 is an enlarged detail cross-sectional view of the axle mounting.

Axle 7 is welded to a block 9 which is fixed firmly on a bolt 12. The rubber metal members 10 are held on each side of the block 9 by the bolt 12 and are held in compression. The rubber elements 11 in each block are in the form of thick wall cones which, when projected to their apexes as shown by the dotted lines in FIG. 3, have apexes which lie on the center line of the bolt 12 and in a vertical place passing through the center line of the axle 7.

The bolt 12 can twist with respect to lever 4 for the one-sided spring suspension of axle 7 so that the twisting movement is absorbed in the rubber elements in the members 10.

I claim:

1. A vehicle axle mounting comprising a vehicle frame, a pair of levers parallel to said frame and pivotally attached at one end to said frame and at the other end to spring means secured to said frame, a solid axle extending transversely to said levers intermediate the ends thereof, means at each lever for connecting said axle to said levers comprising a pair of rubber-metal bearing members disposed in said lever and having thick wall rubber layers with each layer being of rubber and in the form of a frustum on a cone and spaced from each other axially with respect to an axis coaxial with the axes of the frustums, and bolt means transverse to said axle for joining each lever to said axle and for holding said members opposed to each other under compression and with the apices of said frustums meeting at a point disposed on the axis of said bolt means and lying in a transverse vertical plane containing the axis of said axle.

2. A mounting as in claim 1, in which the pivotal attachments of said levers comprise rubber bearings, and said spring means comprises an air-cushioned spring.

3. A mounting as in claim 2, further comprising a brace extending diagonally between and secured to said axle and said frame.